United States Patent
Pan et al.

(10) Patent No.: US 12,002,936 B2
(45) Date of Patent: Jun. 4, 2024

(54) METHOD FOR SEPARATING INDIVIDUAL CATHODE-ACTIVE MATERIALS FROM LI-ION BATTERIES

(71) Applicants: UCHICAGO ARGONNE, LLC, Chicago, IL (US); Michigan Technological University, Houghton, MI (US)

(72) Inventors: Lei Pan, Houghton, MI (US); Tinuade Ololade Folayan, Houghton, MI (US); Jeffrey S. Spangenberger, Naperville, IL (US); Bryant J. Polzin, Deerfield, IL (US)

(73) Assignees: UChicago Argonne, LLC, Chicago, IL (US); Michigan Technological University, Houghton, MI (US)

( * ) Notice: Subject to any disclaimer, the term of this patent is extended or adjusted under 35 U.S.C. 154(b) by 896 days.

(21) Appl. No.: 16/985,028

(22) Filed: Aug. 4, 2020

(65) Prior Publication Data
US 2022/0045374 A1    Feb. 10, 2022

(51) Int. Cl.
*H01M 10/54* (2006.01)
*B03D 1/02* (2006.01)
*C01B 25/45* (2006.01)
*C01G 53/00* (2006.01)
(Continued)

(52) U.S. Cl.
CPC ............ *H01M 10/54* (2013.01); *B03D 1/023* (2013.01); *C01B 25/45* (2013.01); *C01G 53/42* (2013.01); *C01G 53/44* (2013.01); *H01M 10/0525* (2013.01); *B03D 2201/02* (2013.01); *B03D 2201/04* (2013.01); *C01P 2006/40* (2013.01);
(Continued)

(58) Field of Classification Search
CPC .......................... B03D 1/023; B03D 2201/02; B03D 2201/04; C01B 25/45; C01G 53/42; C01G 53/44; C01P 2006/40; C01P 2006/80; H01M 10/0525; H01M 10/54; H01M 2004/028; Y02E 60/10; Y02W 30/84
See application file for complete search history.

(56) References Cited

U.S. PATENT DOCUMENTS 8,714,361 B2    5/2014   Ellis
8,882,007 B1    11/2014  Smith et al.
(Continued)

OTHER PUBLICATIONS

Liu, et al., "Recovery of LiCoO2 and graphite from spent lithium-ion batteries by cryogenic grinding and froth flotation," Minerals Engineering 148, 106223, 10 pages (2020).
Shin, et al., "Electrochemical Performance of Recycled Cathode Active Materials Using Froth Flotation-based Separation Process," Journal of the Electrochemical Society 167(2), 020504, 12 pages (2020).
Zhan, et al., "De-agglomeration of cathode composites for direct recycling of Li-ion batteries," Waste Management 105, pp. 39-48 (2020).
(Continued)

*Primary Examiner* — Dirk R Bass
(74) *Attorney, Agent, or Firm* — Foley & Lardner LLP (57) ABSTRACT

Method of separating individual cathode active materials from a mixture of cathode active materials by froth flotation has been developed. They are based on using appropriate chemical reagents that selectively hydrophobize individual cathode active materials to be recovered, so that they can be collected by air bubbles used in flotation and separated from other mixtures. The chemical reagents are amphiphilic molecules with specialized head groups have a strong affinity to metal elements on surfaces of cathode materials. This method enables a separation of individual cathode active material from a mixture of cathode active materials.

17 Claims, 3 Drawing Sheets

(51) Int. Cl.
*H01M 10/0525* (2010.01)
*H01M 4/02* (2006.01)
(52) U.S. Cl.
CPC ... *C01P 2006/80* (2013.01); *H01M 2004/028* (2013.01); *Y02W 30/84* (2015.05)

(56) References Cited

U.S. PATENT DOCUMENTS

| | | | |
|---|---|---|---|
| 10,046,334 B2 | 8/2018 | Ellis et al. | |
| 2014/0291210 A1* | 10/2014 | Ellis | H01M 6/52 |
| | | | 209/2 |

OTHER PUBLICATIONS

Zhan, et al., "Recovery of active cathode materials from lithium-ion batteries using froth flotation," Sustainable Materials and Technologies 17, e00062, 9 pages (2018).
Zhang, et al., "A Sustainable Process for the Recovery of Anode and Cathode Materials Derived from Spent Lithium-Ion Batteries," Sustainability 11(8), 2363, 11 pages (2019).
Zhang, et al., "Application of mechanical crushing combined with pyrolysis-enhanced flotation technology to recover graphite and LiCoO2 from spent lithium-ion batteries," Journal of Cleaner Production 231, pp. 1418-1427 (2019).

* cited by examiner

METHOD FOR SEPARATING INDIVIDUAL CATHODE-ACTIVE MATERIALS FROM LI-ION BATTERIES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates to a method of recycling individual cathode active material from lithium-ion battery manufacturing rejects and/or spent lithium-ion batteries. In a more specific aspect, this invention relates to the use of the froth flotation method in separating individual cathode active materials from mixtures of cathode materials.

BACKGROUND

Lithium-ion batteries ("LIBs") have become dominant energy storage devices for consumer electronics, electric vehicles ("EVs"), renewable energy storage, and grid applications. As a result, LIBs are not only ubiquitous but also exist in a large range of sizes and form factors. These LIBs typically have 3-12 years of lifetime depending on applications. Once reaching their end of life, these batteries become not only waste but hazardous materials and need to be managed responsibly and in an environmentally appropriate manner. In addition, the production of LIBs, including the mining process and supply chain for producing the lithium material, has a negative impact on the environment. Thus, recycling of LIBs not only prevents hazardous components from landfilling but also closes the loop of materials' use in LIBs for resource conservation and future sustainability.

Recycling of LIBs is divided into three different categories based on the process used: pyrometallurgy, hydrometallurgy, and direct cathode recycling. Each of these processes has different challenges as well as benefits including superior recovery of certain elemental components over others.

The hydrometallurgical process recovers valuable constituents (e.g., cobalt and nickel) in forms of metal sulfate, metal hydroxide, or precursors by leaching and chemical precipitation processes. The precursors are calcined to synthesize cathode active materials.

The pyrometallurgical process concentrates metal constituents (e.g., cobalt and nickel) in the molten phase and other constituents (e.g., aluminum and lithium) in the slag phase. Often, the pyrometallurgically processed metal alloys are re-processed using a hydrometallurgical method to obtain refined metal products.

Direct recycling is designed to reuse cathode active materials from spent LIBs in manufacturing of new LIBs. There are two steps involved: 1) recovery and purification of electrode materials from LIBs and 2) repair and rejuvenation of recycled electrode materials. Much of the previous efforts have been devoted to the relithiation of spent cathode active materials using a hydrothermal relithiation method, electrochemical relithiation method, and direct calcination method. The recovery of cathode active materials from LIBs involves several steps that can be done in many ways and in many different configurations. Existing processes typically physically shred or otherwise deconstruct the battery, resulting in removal of metals, solvents, salts, and plastics but leaving at best a mixture of cathode and anode materials. Separation of anode composites from cathode composites can be done by several methods including froth flotation method (Zhan, et al., "Recovery of active cathode materials from lithium-ion batteries using froth flotation," Sustainable Materials and Technologies 17, e00062, 9 pages (2018) or via heavy organic liquids (U.S. Pat. No. 9,614,261).

The recycled cathode composite materials from Li-ion batteries may contain a single type of cathode active material, such as lithium cobalt oxide ("LCO"), lithium manganese oxide ("LMO"), lithium cobalt-manganese-nickel oxide ("NMC"), and lithium nickel-cobalt-aluminum oxide ("NCA"), or it may contain a mixture of several of these cathode chemistries. Some EV LIBs may even use more than one type of cathode active material in their chemistry. A mixture of different cathode active materials are obtained and some of the mixtures are not compatible for downstream refining and rejuvenation processing.

There is a need for a process for the separation of individual cathodes from those present in a mixture of more than one cathode chemistry. This may be due to recycling of batteries with differing chemistries or batteries that contain a blended chemistry cathode. One approach, described in U.S. Pat. No. 10,046,334, introduces magnetic separation in separating different cathode active materials based on the difference in magnetism of individual cathode materials to be separated. Lithium iron phosphate ($LiFPO_4$) can be selectively separated first from a mixture of cathode active materials, followed by lithium manganese oxides ($LiMnO_2$) and lithium cobalt oxides ($LiCoO_2$). However, magnetic separation has its drawbacks, including high capital cost and low throughput. Thus, there remains a need for a process to separate individual cathode materials from a mixture of cathode materials.

SUMMARY

One embodiment described herein relates to a process for separating and recovering one type of cathode active material from a mixture of cathode active materials. A slurry is prepared by mixing cathode active materials in water. A collector chemical is used to selectively hydrophobize one type of cathode active material while leaving other components unattached. Separation is achieved when air bubbles float selective hydrophobized materials from the slurry.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
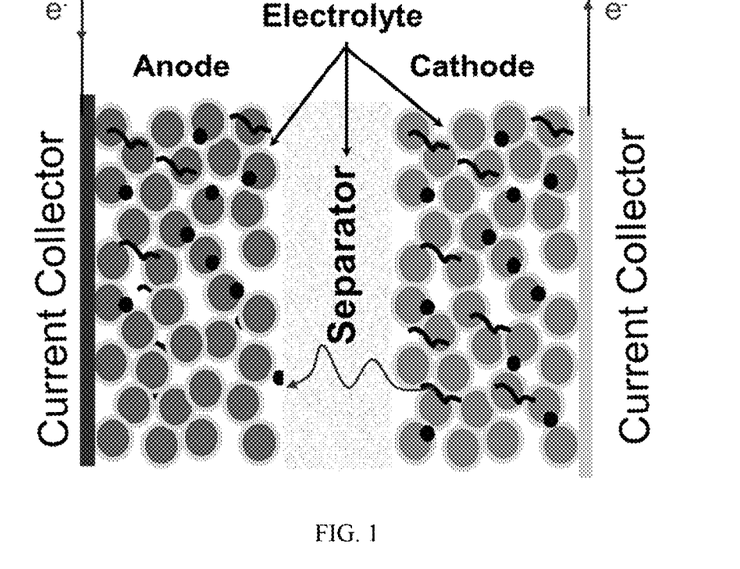
FIG. 1 is a simplified cross sectional view of the components of a lithium ion battery.

Described herein are systems and processes relating to recycling individual cathode active material from lithium-ion battery manufacturing rejects and/or spent lithium-ion batteries. FIG. 1 illustrates the components of a typical lithium ion battery, components which must be addressed in the recycling process. Some embodiments recover single cathode active materials from a mixture of cathode materials. Such recovery enables a rejuvenation of recycled cathode materials for direct use in LIBs manufacturing processes.

Figure 2:
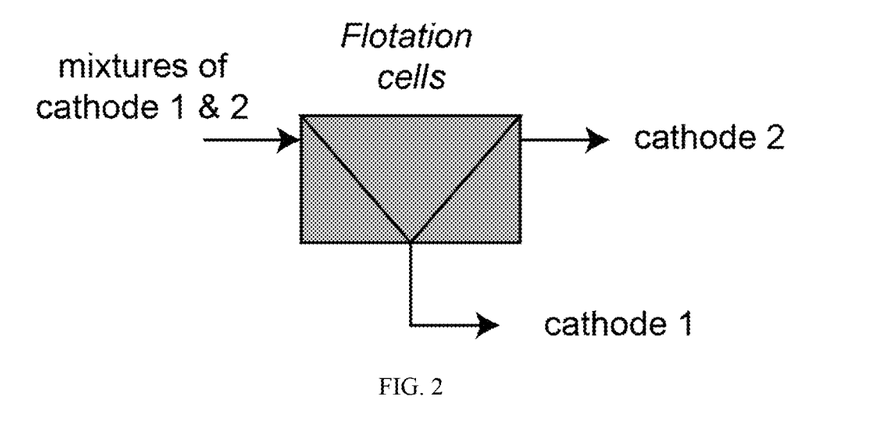
FIG. 2 is a schematic diagram of a froth flotation process of producing one cathode chemistry in froth concentrates and the other cathode chemistry in tailing products from a slurry of binary cathode active materials.

In one embodiment, the systems and methods described herein involve separating mixtures of battery cathode chemistries; in one specific embodiment, lithium battery chemistries. This separation is needed in order to directly recycle the cathode material or to enrich a cathode mixture for use in other recycling processes. One embodiment utilizes a froth flotation method, which may separate one type of cathode material from another, as illustrated graphically in FIG. 2. One aspect provides a method of producing high-purity (>90%) cathode active materials that can be rejuvenated and reused in manufacturing of new lithium-ion battery.

In one aspect, the method may comprise, for lithium-ion batteries, a process of separating and recovering individual cathode chemistry from a mixture of cathode active materials, including a preparation stage and a flotation stage.

The recovery of cathode active materials from LIBs involves several steps. An initial preparation process treats the LIBs to yield a mixture of cathode and anode materials. The preparation process can be done in many ways and in many different configurations.

In one embodiment, the battery is shredded or crushed to liberate the materials for further separation. The liquid components may be drained or removed, for example electrolyte solvents and salts are remove or recovered, and the plastics are removed. Next, the remaining anode and cathode laminates can then be delaminated using thermal, solvent, or other methods. The resultant material is processed to separate the anode and cathode powders, such as by screening or sieving to separate metal collector foils from the anode and cathode powders. The resulting mixture of anode and cathode powders, which may be in solution as a slurry, is then further processed to remove the anode materials. Separation of anode composites from cathode composites can be done by several methods including froth flotation method (Zhan (2018)) or via heavy organic liquids (U.S. Pat. No. 9,614,261). The result of the preparation process will be a cathode powder comprising a mixture of the cathode materials from the LIBs that were processed. In one embodiment, the cathode powder contains only trace (2.5 wt % or less) amounts of polyvinylidene difluoride ("PVDF") binder and/or carbon black. Trace metal foils may be present in the material.

Following the preparation step, a cathode material extraction step involves the separation of individual cathodes from those present in a mixture of more than one cathode chemistry. This may be due to recycling of batteries with differing chemistries or batteries that contain a blended chemistry cathode.

The separated cathode powders are mixed with a liquid, such as water, to form a cathode composite slurry. In one embodiment, the cathode composite slurry has a concentration of solids of 1-20 wt %. The slurry may be pH-adjusted to a range of 7-12. The cathode composite slurry further is modified with one or more collector chemicals to alter the hydrophobic/philic nature of one or more components of the cathode composite slurry. In one embodiment, the collector chemicals alter at least one of the cathode active materials in the cathode composite slurry to be hydrophobic. Collector chemicals are typically surfactant molecules that selectively bind to the surface of the target minerals resulting in an increase in their surface hydrophobicity, a necessary condition for particles to be attached on air bubbles in flotation cells and separated from the remaining slurry. For naturally hydrophobic particles graphite, carbon or non-polar oils (e.g. kerosene, dodecane, diesel) are commonly used as the collector. For carbon-coated lithium iron phosphate ("LFP") particles, non-polar oils may be used as the collector. For sulfide minerals, xanthate chemicals are commonly used. For oxides, a number of collector chemicals may be used. Fatty acids are commonly used in flotation of oxide and phosphate minerals. Other collectors include hydroxamic acid with the formula of RC(O)N(OH)R', where R and R' are organic radicals, phosphonate collectors including CP(O)(OH)$_2$ or CPO(OR)$_2$, where R represents an alkyl or an aryl group, and phosphate collectors having the structure of P(=O)(OR)$_3$ with a phosphorous valence state of 5.

In one embodiment, chelating agents might be used as the collector in oxide flotation. These chemicals selectively bind to metal sites, such as cobalt, nickel. In one embodiment, five different types of chelating reagents may be used, including N—O, O—O, S—N, S—S, and N—N. These chemicals may be used alone or combined with other chemicals. Frother chemicals are added to encourage and facilitate frothing, such as methyl isobutyl carbinol ("MIBC") and polyglycol ("PPG"). The frother chemical enables a reduction of the surface tensions of the aqueous slurries, and facilitating a formation of air bubbles with bubble diameters of less than 1 mm and stable froth layers. In one embodiment, the dosage of this frother chemical is in the range of 10-50 ppm. The slurry, or a portion of the slurry, is then aerated to form a stable froth layer. Gases are used such as nitrogen, air, argon. In one embodiment, the aeration rate is 2-10 liters per minutes for 2 liters of flotation cells. The aeration rate should be adjusted proportionally to the sizes of flotation cells.

Aeration forms bubbles that rise to the surface, forming froth at the surface. The froth exits the cell and is separated from the remaining slurry in a batch or continuous process. The tailing products, which may comprise more than one cathode chemistry, may be further treated by feeding them to the next flotation stage or rounds (a first stage concentrate, second stage concentrate and so on for multi-stage embodiments described below). The froth may be dewatered by filtration and dried, such as in a forced air oven at a temperature of 100-105° C.

Where either or both the froth concentrates and tailing products of cathode composite materials from the froth contains more than one type of cathode active material, further processing may be necessary. The froth flotation process described above may proceed in multiple stages or rounds to concentrate specific cathode active materials, such as isolating individual compounds from a mixture of active material compounds. A stage of froth flotation may be applied to the concentrate of the cathode composite material from a prior stage or to the tailings from a prior stage. In such staged processes, either the first stage concentrate or first stage tailing is fed into a second stage of the froth flotation process for separation to form a second stage slurry with 1-20 wt % solid concentration. The second stage slurry may be pH adjusted to a range of 7-12. Collector chemicals that render one cathode active material hydrophobic are added to the slurry to aid in forming a froth. The collector chemicals may be selected to render a first cathode active material or a mixture of cathode active materials present in the slurry as hydrophobic (while not altering the others).

The types of collectors added depend on targeted cathode chemistry to be separated. In one embodiment, the types of collectors used in this stage is similar to the step before, in which the first component of cathode materials is separated and recovered from a mixture of cathode chemistry. Frother chemicals are added to encourage and facilitate frothing, such as MIBC and PPG. The frother chemical enables a reduction of the surface tensions of the aqueous slurries, and facilitating a formation of air bubbles with bubble diameters of less than 1 mm and stable froth layers. The dosage of this frother chemical is in the range of 10-50 ppm. The slurry, or a portion of the slurry, is then aerated for 5-20 minutes. The aeration forms bubbles that rise to the surface, forming froth at the surface. Some or all of this froth can be removed, in a batch or continuous process. The froth may be further treated to form a second stage concentrate of the cathode composite materials (a first stage concentrate, second stage concentrate and so on for multi-stage embodiments described below). For example, froth may be dewatered by filtration and dried, such as in a forced air oven at a temperature of 100-105° C. (e.g., 105° C.). A second stage tailing contains the other cathode active materials and may be further processed as described to select a specific cathode active material from among them for formation of a concentrate.

Figure 3:
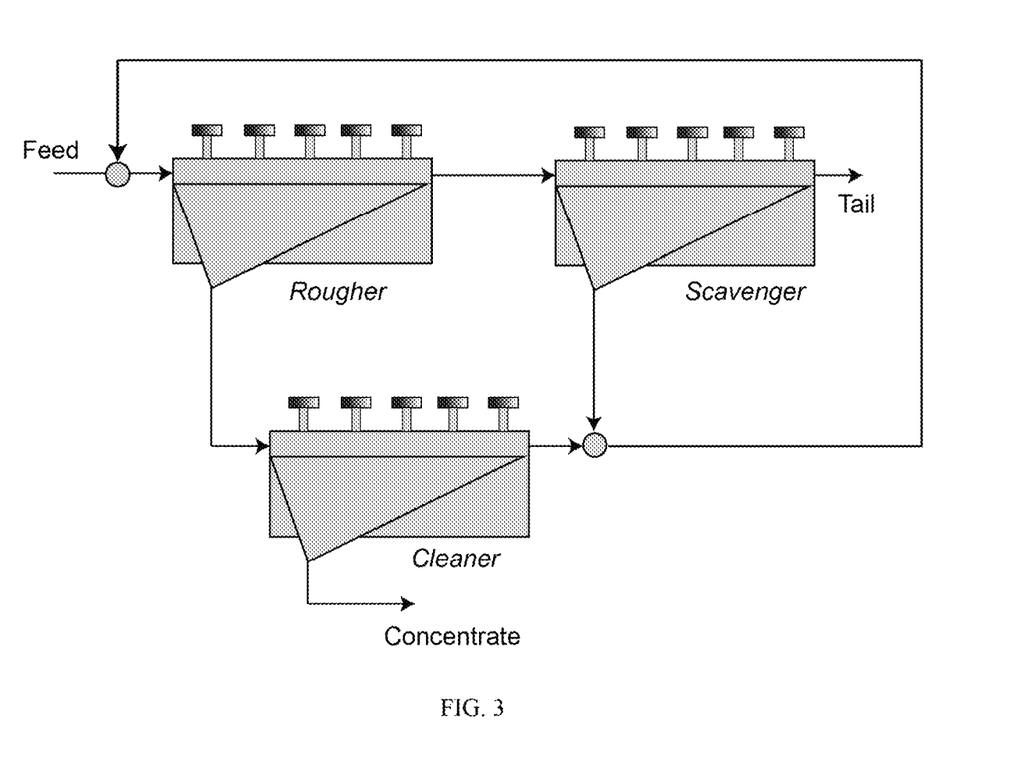
FIG. 3 is a schematic diagram of a typical froth flotation circuit in producing individual cathode materials from a binary mixture of cathode active materials.

FIG. 3 illustrates one embodiment of a general froth flotation circuit for separating a mixture into two different product streams using the cathode composite slurry as the feedstock. One flotation circuit can comprise three stages (rougher, scavenger, and cleaner stages), which produces two product streams (concentrate and tailings). Each circuit products a concentrate and a tailing and may include one or more of a roughing stage (rougher), a cleaning stage (cleaner), and a scavenging stage (scavenger), which may be performed in a sequence for a number of cycles to achieve an improved separation and recovery performance of a desired material such as a particular cathode material or may be performed in a series of circuits each adapted to extract a particular material from the output of the prior process (starting with the cathode composite slurry) as compared to a single flotation stage. In a further embodiment, additional cathode slurry, which may be from a different batch of batteries and may include different cathode materials in the slurry, may be add at one or more cycles.

Figure 4:
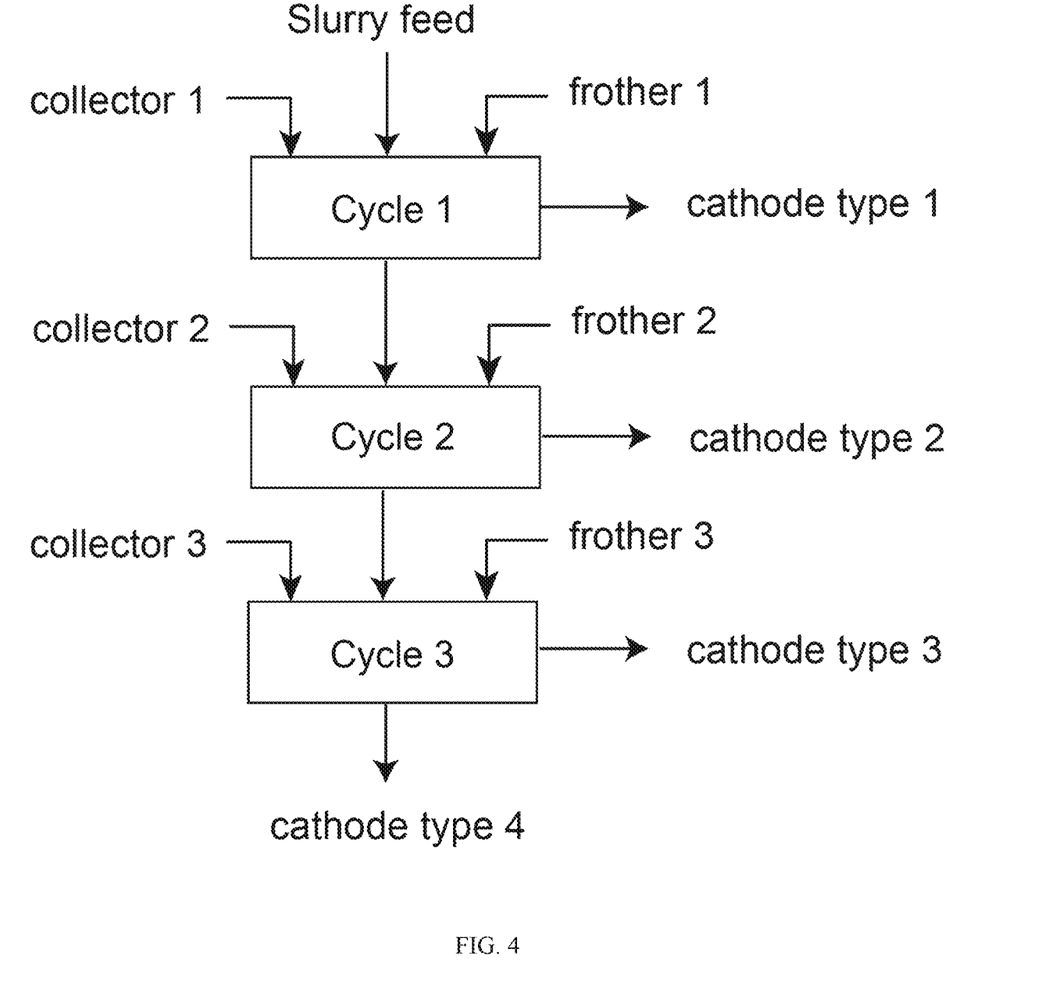
FIG. 4 is a schematic diagram of a process and flow diagram illustrating a separation of individual cathode active materials from a mixture of multiple cathode active materials.

FIG. 4 illustrates a process having three circuits (circuit 1, circuit 2, and circuit 3) in separating four cathode chemistries from a mixture of cathodes. In the process of FIG. 4, three different cathode collectors may be input in the form of a cathode composite slurry. Three different frothers are selected to collect a particular type of cathode material. In the illustrated embodiment, the tailings from the third cycle also contain a fourth type of cathode material. It should be appreciated that each cycle, such as shown in FIG. 4, may include one more stages as shown in FIG. 3.

Preparation of a Mixture of Cathode Materials

Preparation of a Mixture of Anode and Cathode Materials.

For pristine cathode materials, a given amount of pristine cathode materials are mixed with water to prepare a slurry of a mixture of cathode active materials. For spent cathode materials, spent LIBs are crushed and washed with deionized ("DI") water three times to remove electrolyte. The cathode layers are manually separated from other battery components. The cathode composite materials are delaminated from current collectors manually by thermal treatment at a temperature of 500° C. for 1 hour to remove PVDF binders and carbon black. The products are free of PVDF binders and carbon black.

Separation of Different Cathode Materials by Froth Flotation.

Cathode powders are mixed with DI water to prepare slurries with 1-20% solid concentration. The slurry is fed into the cell for materials separation and conditioned for 1-3 minutes. If needed, the pH of the slurry can be changed by adding dilute HCl or dilute NaOH solutions. A collector chemical is added to selectively render one type of cathode chemistry hydrophobic. Then frother chemicals such as MIBC are added. The slurry and floating froth concentrates are aerated for a period of 5-20 minutes. The froth concentrates might be cleaned 2-3 times depending on solid concentrations of slurry to remove entrainments. The tailing products are combined, dewatered, and dried.

In embodiments where the mixed feed contains more than two mixed cathode active materials, additional froth flotation stages may be used as needed. In this process, mixed cathode active materials are fed to a second stage of the froth flotation process for separation. The tailing products or froth concentrates are fed into a flotation cell. If needed, the slurry pH can be adjusted by adding dilute sulfuric acid ($H_2SO_4$) or sodium hydroxide (NaOH) solutions. The collector is added to selectively render one cathode chemistry hydrophobic. The frother is then added. The slurry and floating froth concentrates are aerated for a period of 5-20 minutes. The froth concentrates might be cleaned to remove the entrainment. A total of 2-3 cleaning stages might be needed to achieve a good separation process.

EXAMPLES

Example 1

A binary mixture of pristine NCA and pristine LCO was used as the example in this study. They were fed to a Denver D12 flotation cell with DI water to obtain a 1-3% solid concentration of slurry. The natural pH was approximately 10. Flotation experiments were conducted using 50 ppm Atrac 922 (Nouryon) as the collector and 20 ppm MIBC as the frother. The Atrac 922 was a commercial collector used in oxide flotation. This collector was found to be selectively adsorbed on NCA surface, while leaving LCO unaffected at a collector dosage of 50 ppm. Flotation experiments were conducted at a natural pH and no additional acid or base solutions were added. Table 1 shows the result obtained from a laboratory-scale flotation experiment. As shown, a good separation was achieved between NCA and LCO. A purity of 95.0% NCA with a recovery of 94.4% was produced in froth concentrates from a 1:1 mixture of NCA and LCO. The separated tailing product contained 92.0% LMO with a total recovery of 92.8%.

TABLE 1

Separation results between NCA and LMO.

| | Composition (%) | |
|---|---|---|
| Product | NCA | LCO |
| Froth Concentrate | 95.0% | 5.0% |
| Tailing | 8.0% | 92.0% |

Example 2

A mixture of pristine lithium nickel manganese cobalt oxide ($LiNi_{0.33}Mn_{0.33}Co_{0.33}O_2$ or NMC111) and LMO (1:1 by weight) was fed to a Denver D12 flotation cell. The flotation experiments were conducted using 50 ppm Atrac 922 (Nouryon) as the collector and 20 ppm MIBC as the frother. The flotation experiments were conducted at natural pH of 11. Table 2 shows the result obtained using the release analysis protocol. The result shows that a good separation between NMC111 and LMO was achieved. The froth concentrate contained 82.0% NMC111 and 18.0% LMO with a NMC111 recovery of 90.4%. The tailing product contains 94.0% LMO and 6.0% NMC111 with a LMO recovery of 98.0%

TABLE 2

Separation results between NMC111 and LMO.

| | Composition (%) | |
|---|---|---|
| Product | NMC111 | LMO |
| Froth Concentrate | 82.0% | 18.0% |
| Tailing | 6.0% | 94.0% |

Example 3

A 1:1 ratio by weight of a mixture of LFP and NMC111 was fed to a Denver D12 flotation cell. Since LPF is naturally hydrophobic due to carbon coating, it can be floated in water by air bubbles without any collectors. In this example, a small dosage of kerosene was used, enabling a better separation between LFP and NMC111. Flotation experiments were conducted using 20 ppm of kerosene as the collector and 20 ppm of MIBC as the frothers. The froth flotation experiments were conducted at natural pH. Table 3 shows the result obtained in a laboratory-scale Denver cell. The result shows that the froth concentrate comprises of 99.2% LFP and 0.8% NMC111. The tailing product comprises of 98.9% NMC111 and 1.1% LFP. The recovery of LFP and NMC111 in the separated product lines are above 96%, demonstrating its effectiveness in separating this binary mixture by the froth flotation method.

TABLE 3

Separation results between LFP and NMC111.

| | Composition (%) | |
|---|---|---|
| Product | LFP | NMC111 |
| Froth Concentrate | 99.2% | 0.8% |
| Tailing | 1.1% | 98.9% |

Example 4

Cathode active materials in the recycled stream ($Li_xMO_2$, $0<x<1$, where M denotes transition metal) may contain transition metal oxides with lesser lithium compared to pristine cathode active materials. The deficiency of lithium in cathode active materials can be attributed to a high state-of-charge of batteries prior to the recycling process or a degradation of cathode active materials after numerous charging-discharging cycles. In this example, pure metal oxides, including nickel oxides ($NiO_2$), cobalt oxides ($Co_3O_4$), and manganese oxides ($MnO_2$), were used as the samples that mimic spent cathode materials from the recycled stream. Sodium perfluorooctane was used as the collector, and MIBC was used as the frother. Table 4 shows the percentage of floated materials after a 5-minute flotation in a 50 mL flotation cell. At 45 ppm dosage of sodium perfluorooctane, both $NiO_2$ and $Co_3O_4$ were floatable, suggesting that both types of metal oxides are hydrophobic due to an adsorption of the collector chemical, while the $MnO_2$ particles remained in the slurry. Evidently, separation of $Co_3O_4$ from $MnO_2$ or separation of $NiO_2$ from $MnO_2$ is feasible.

TABLE 4

Percentage of materials floated using sodium perfluorooctane as the collector.

| | Floated (%) | | |
|---|---|---|---|
| Collector Dosage | $NiO_2$ | $Co_3O_4$ | $MnO_2$ |
| 30 ppm | 95% | 94% | 8% |
| 45 ppm | 90% | 97% | 11% |
| 75 ppm | 95% | 99% | 10% |
| 90 ppm | 97% | 97% | 15% |

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method of processing lithium-ion batteries comprising:
    Forming a cathode composite slurry comprising a liquid and 1-20 wt % of two or more cathode active materials;
    Modifying at least one of the two or more cathode active materials to be hydrophobic;
    Adding a frother chemical to the cathode composite slurry;
    Aerating the cathode composite slurry, forming a froth and a tailing;
    Separating the froth; and
    Drying the froth to collect a first cathode active material of the two or more cathode active materials;
    Wherein modifying at least one of the two or more cathode active materials comprises interaction of the at least one of the two or more cathode active materials with a collector chemical.

2. The method of claim 1, wherein the cathode composite slurry has a pH of 7-12.

3. The method of claim 1, wherein the collector chemical is a chelating agent.

4. The method of claim 1, wherein the collector chemical is selected from the group consisting of hydroxamic acid, phosphonate, and phosphate.

5. The method of claim 1, wherein aerating comprises forming air bubbles with diameters less than 1 mm.

6. The method of claim 1, wherein aerating comprises bubbling inert gas or air at a rate of 1-5 liters per minute per 1 liter of cathode composite slurry for 5 to 20 minutes.

7. The method of claim 1 wherein the frother comprises methyl isobutyl carbinol (MIBC) or polyglycol (PPG).

8. The method of claim 1 further comprising:
    drying the tailing to form tailing solids comprising one or more cathode active materials;
    forming a second cathode composite slurry comprising a liquid and 1-20 wt % of the one or more cathode active materials;
    modifying at least one of the one or more cathode active materials to be hydrophobic;
    adding a second frother chemical to the cathode composite slurry;
    aerating the second cathode composite slurry, forming a second froth and a second tailing;
    separating the second froth from the second tailing; and
    drying the second froth to collect a second cathode active material of the two or more cathode active materials.

9. The method of claim 8, wherein modifying at least one of the one or more cathode active materials comprises interaction of the at least one of the one or more cathode active materials with a second collector chemical.

10. The method of claim 9, wherein the second collector chemical is different from the collector chemical.

11. A method of processing lithium-ion batteries comprising:
    Preparing cathode active material from a lithium-ion battery by:
        Draining liquid components of the lithium-ion battery;
        Physically separating components of the lithium-ion battery forming a mixture of anode and cathode powders;
        Separating the anode powder from the cathode powder forming a mixed cathode powder comprising two or more cathode active materials; and
    Collecting one of the two or more cathode active materials by:
        Mixing the mixed cathode powder with a liquid to form a slurry having 1-20 wt % solid;
        Modifying at least one of the two or more cathode active materials of the mixed cathode powder to be hydrophobic;
        Adding a frothing agent to the slurry;
        Aerating the slurry for 5 to 20 minutes, forming a froth;
        Collecting the froth; and
        Concentrating at least one of the two or more cathode active materials from the froth;
    Wherein modifying at least one of the two or more cathode active materials comprises interacting at least one of the two or more cathode active materials with a collector chemical.

12. The method of claim 11, wherein the slurry has a pH of 7-12.

13. The method of claim 11, wherein the collector chemical is a chelating agent.

14. The method of claim 13, wherein the collector chemical is selected from the group consisting of hydroxamic acid, phosphonate, and phosphate.

15. The method of claim 11, wherein aerating comprises forming air bubbles with diameters less than 1 mm.

16. The method of claim 11, wherein aerating comprises bubbling inert gas or air at a rate of 1-5 liters per minute per 1 liter of the slurry for 5 to 20 minutes.

17. The method of claim 11, wherein the frother comprises methyl isobutyl carbinol (MIBC) or polyglycol (PPG).

* * * * *